(12) United States Patent
Uchiyama et al.

(10) Patent No.: US 6,224,089 B1
(45) Date of Patent: May 1, 2001

(54) CONNECTING STRUCTURE BETWEEN AN AIRBAG AND AN INFLATOR

(75) Inventors: Atsuyuki Uchiyama; Joji Mishina; Yasushi Masuda; Ryosuke Nakanishi, all of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/395,962

(22) Filed: Sep. 14, 1999

(30) Foreign Application Priority Data

Sep. 14, 1998 (JP) .................................................. 10-260192

(51) Int. Cl.[7] .................................................. B60R 21/16
(52) U.S. Cl. ..................................... 280/728.2; 280/730.2; 280/733
(58) Field of Search .............................. 280/728.2, 730.2, 280/731, 740, 733

(56) References Cited

U.S. PATENT DOCUMENTS

| | | | |
|---|---|---|---|
| 3,801,156 | * 4/1974 | Granig | 280/733 |
| 4,793,631 | * 12/1988 | Takada | 280/728.2 |
| 5,131,677 | * 7/1992 | Horiuchi et al. | 280/728.2 |
| 5,564,739 | * 10/1996 | Davdison | 280/730.2 |
| 5,577,763 | * 11/1996 | Cuevas | 280/728.2 |
| 5,806,883 | * 9/1998 | Cuevas | 280/728.2 |
| 5,931,491 | * 8/1999 | Bosgeiter et al. | 280/728.2 |
| 6,073,961 | * 6/2000 | Bailey et al. | 280/730.2 |
| 6,082,761 | * 7/2000 | Kato et al. | 280/728.2 |

* cited by examiner

*Primary Examiner*—Peter C. English
(74) *Attorney, Agent, or Firm*—Foley & Lardner (57) ABSTRACT

To improve the strength in the connection between an inflator and an airbag, an area around a gas inlet 12 of an airbag 10 is fitted onto an inflator 30 and is bound tightly by two bands 14. The areas of the airbag 10 near the bands 14 are provided with stitches 16 extending in the circumferential direction of the inflator 30. The stitches 16 rise from the outer surface of the airbag 10. The areas around the gas inlet of the airbag 10 and the inflator 30 are held by saddle bands 24 of a holder 20. The stitches 16 are caught by the bands 14 when the airbag 10 is inflated and the airbag 10 is about to be slipped off, thereby securely preventing the detachment of the airbag 10.

17 Claims, 8 Drawing Sheets

CONNECTING STRUCTURE BETWEEN AN AIRBAG AND AN INFLATOR

BACKGROUND OF THE INVENTION

1. Field of the Invention

The present invention relates to a connecting structure between an airbag and an inflator used for an automobile or other vehicle. More particularly, the present invention relates to connecting structure between an airbag and a rod-type inflator having a rod-like shape in which gas is spouted out from one end of the inflator.

2. Description of the Related Art

A rod-type inflator is employed in a side airbag device arranged on a side of a vehicle seat, a head protecting airbag device of which an airbag is inflated on a side of a vehicle occupant's head, a torso/lap protecting airbag device (sometimes referred to as "inflatable belt device") which is assembled in a webbing of a seat belt, or other airbag device.

SUMMARY OF THE INVENTION

It is an object of the present invention to provide a connecting structure between an airbag and a rod-type inflator which can provide high strength in the connection.

A connecting structure between an airbag and an inflator according to the present invention comprises: a rod-type inflator having gas ports formed in an end portion thereof; an airbag having a gas inlet fitted onto the inflator; a binding member for fixing the gas inlet of the airbag to the inflator; and a securing member for preventing the airbag from coming off the binding member.

The securing member may be disposed on the airbag and may comprise stitches which rise from the outer surface of the airbag.

The securing member may comprise a cloth or resin sewn to the outer surface of the airbag.

The securing member may comprise a bar member which is inserted into a through portion formed in the airbag.

In the connecting structure between the airbag and the inflator, the securing member is disposed on the airbag and the securing member is caught by the binding member when the airbag is about to come off the spaces between the binding member and the inflator, thereby preventing the airbag from further sliding in a detaching direction.

In the present invention, the inflator may have a groove formed in the outer surface thereof to extend in the circumferential direction and the securing member may comprise a portion of the airbag which is pushed into the groove.

The connecting structure between an airbag and an inflator according to the present invention may comprise a holder for fixing the inflator to a vehicle body. The holder may comprise a plurality of holding portions and the binding member may be arranged between the holding portions.

BRIEF DESCRIPTION OF THE DRAWINGS

Hereinafter, preferred embodiments of the present invention will be described with reference to attached drawings.

DETAILED DESCRIPTION OF THE PREFERRED EMBODIMENTS

Figure 1:
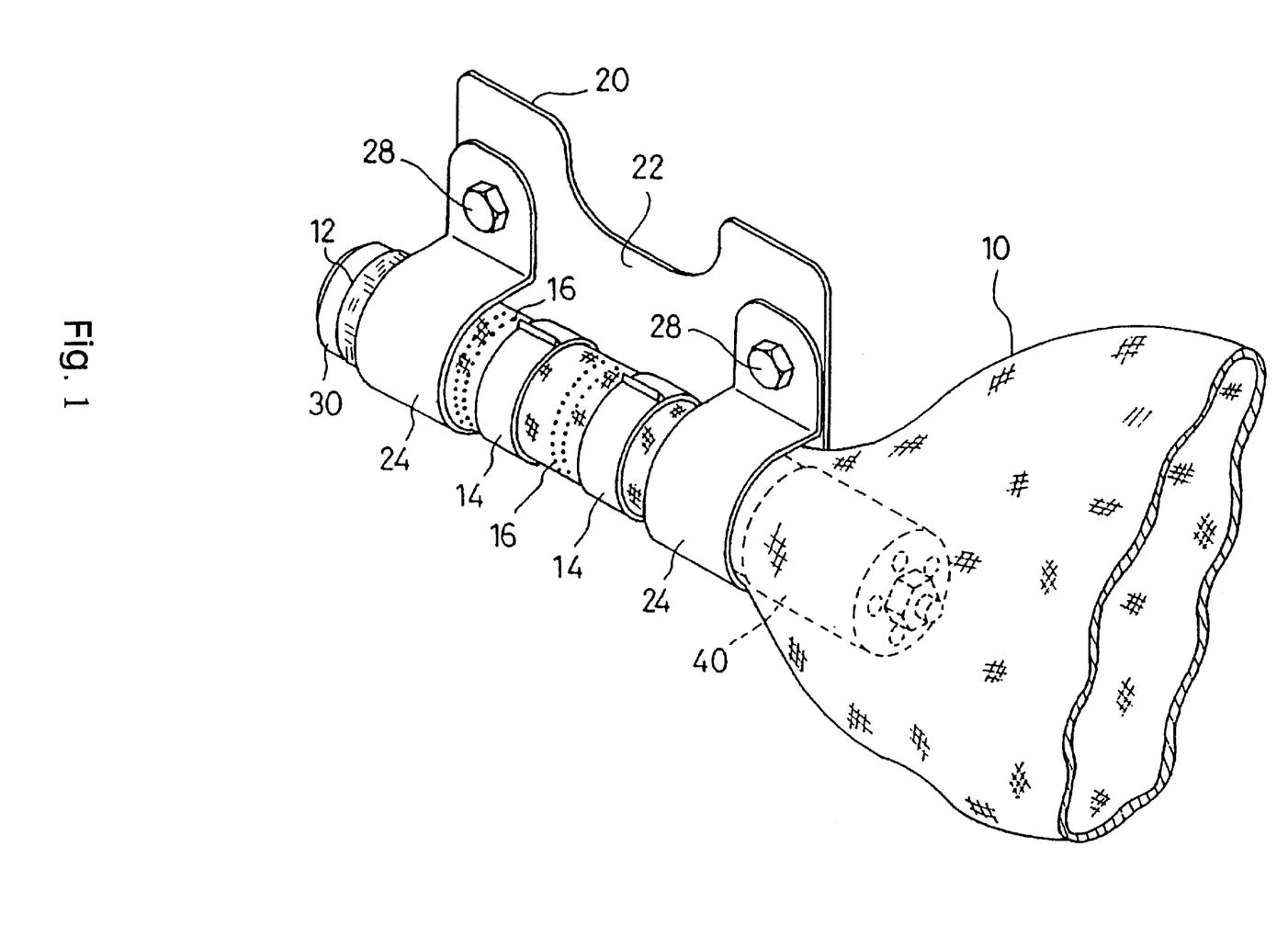
FIG. 1 is a perspective view showing a connecting structure between an airbag and an inflator according to an embodiment of the present invention.
Figure 2:
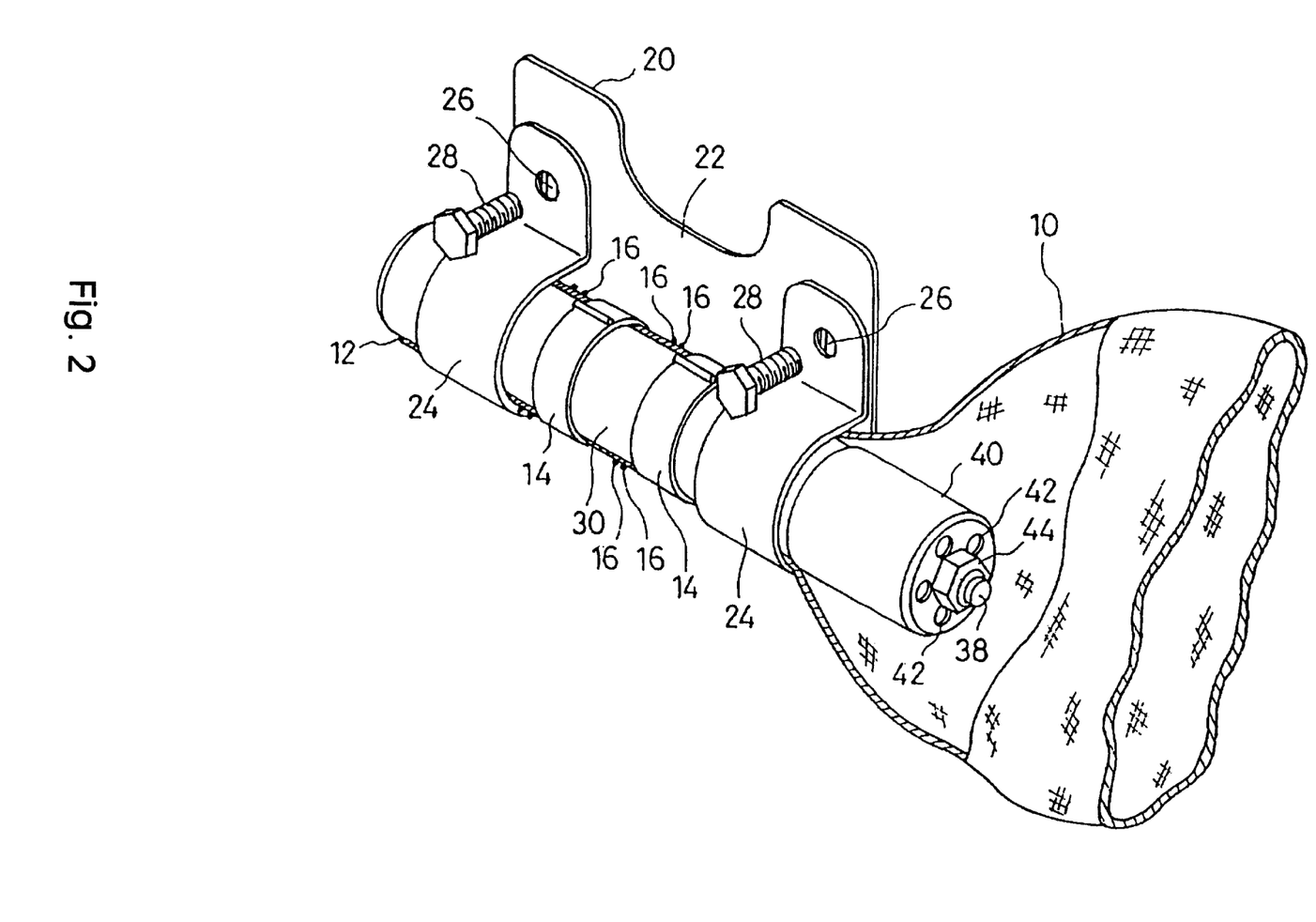
FIG. 2 is a perspective view similar to FIG. 1 with the airbag being cut away.
Figure 3:
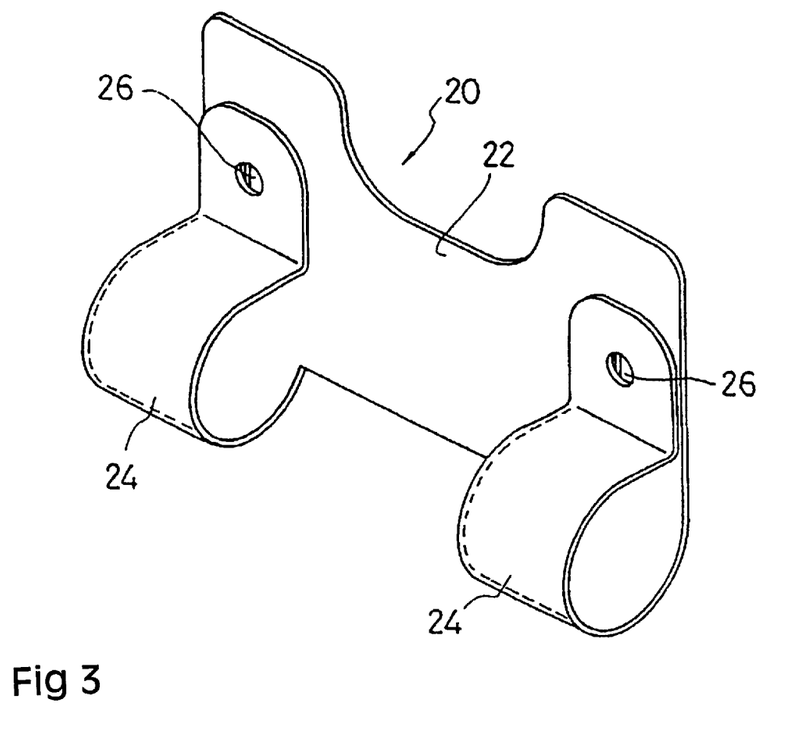
FIG. 3 is a perspective view showing a holder used in the connecting structure shown in FIGS. 1 and 2.
Figure 4:
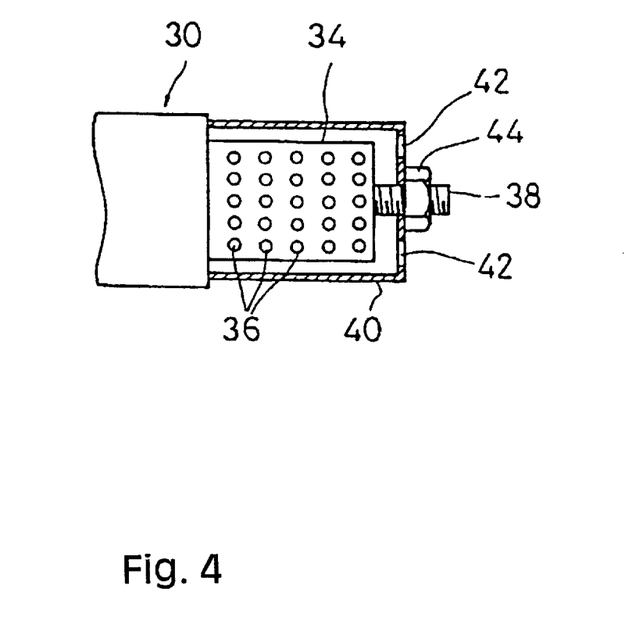
FIG. 4 is a sectional view of an end portion of the inflator in FIGS. 1 and 2.

FIGS. 1 through 4 show a connecting structure between an airbag and an inflator according to an embodiment of the present invention. FIG. 1 is a perspective view of a connected portion between the inflator and the airbag, FIG. 2 is a perspective sectional view of the same portion as shown in FIG. 1, FIG. 3 is a perspective view of a holder, and FIG. 4 is a sectional view of an end portion of the inflator.

In this embodiment, an area around a gas inlet 12 of an airbag 10 is fitted onto an inflator 30 and is bound tightly by binding members (two bands 14 in FIGS. 1 and 2). The areas of the airbag 10 near the bands 14 are provided with stitches 16 extending in the circumferential direction of the inflator 30. The stitches 16 rise from the outer surface of the airbag 10. The airbag 10 and the inflator 30 are held by saddle bands 24 of a holder 20.

The holder 20 comprises a plate 22 and a pair of saddle bands 24. Ends of the saddle bands 24 are superposed on the plate 22 and bolt holes 26 are formed in the superposed portions of the saddle bands 24 and the plate 22. Inserted into the bolt holes 26 are bolts 28. By screwing the bolts 28, the airbag 10 and the inflator 30 are connected to the holder 20, and the holder 20 is fixed to a component of a vehicle body by the bolts 28.

The inflator 30 is provided with gas ports 36 formed in the outer surface of the end portion 34 thereof. A head cap 40 is fitted onto the inflator 30 to cover the end portion 34. A stud bolt 38 projects from an end face of the end portion 34. The stud bolt 38 is inserted through an opening of the head cap 40. By seating a nut 44 to the stud bolt 38, the head cap 40 is fixed to the inflator 30. The head cap 40 is provided with a plurality of gas ports 42 formed in the end face thereof.

In this embodiment, the area around the gas inlet 12 of the airbag 10 is bound tightly by the binding bands 14 and the saddle bands 24, securely preventing gas leakage from the gas inlet 12 of the airbag 10. Since the stitches 16 rise from the outer surface of the airbag 10 near the bands 14, the stitches 16 are caught by the bands 14 when the airbag 10 is inflated and the airbag 10 is about to be slipped off in the rightward direction of FIGS. 1 and 2, thereby securely preventing the detachment of the airbag 10 from the inflator 30.

Figure 5:
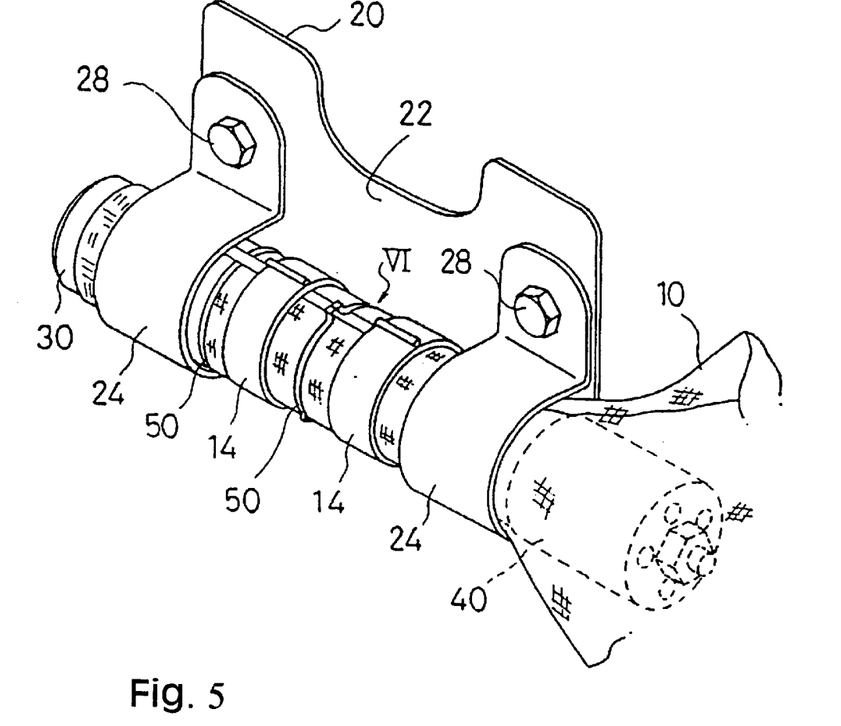
FIG. 5 is a perspective view of a connecting structure between an airbag and an inflator according to another embodiment of the invention.
Figure 6:
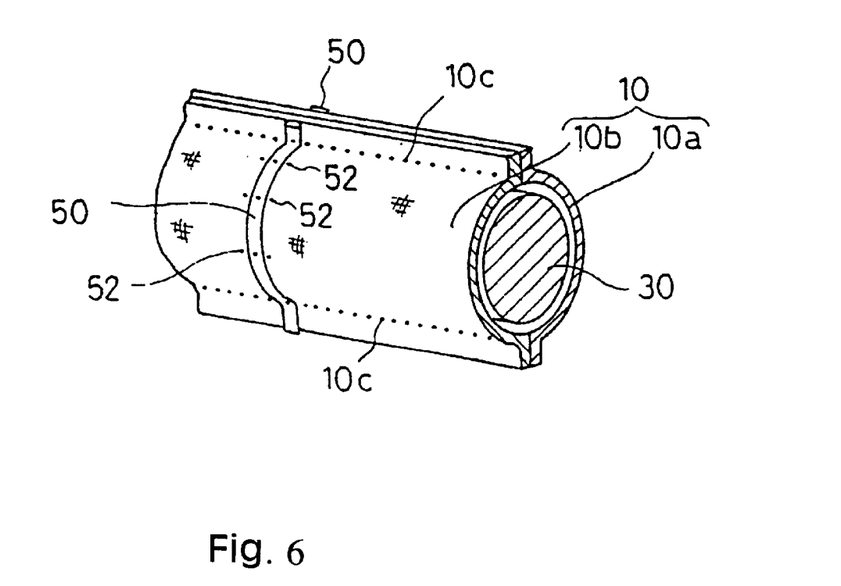
FIG. 6 is an enlarged view of a portion VI of FIG. 5.

FIG. 5 is a perspective view of a connecting structure between an airbag and an inflator according to a second embodiment of the invention, and FIG. 6 is an enlarged view of a portion VI of FIG. 5.

In this embodiment, bar members 50 are provided instead of the stitches 16. An airbag 10 of this embodiment comprises two panels 10a, 10b of the same shape which are superposed on each other and sewn together around their peripheries to make an enveloped configuration. Numeral 10c designates stitches on the sewn portions (sewing yarns). Sewn to the panels 10a, 10b are soft bar members 50. The bar members 50 are sewn to the panels 10a, 10b by the stitches 10c and also by additional stitches 52.

The bar members 50 extend in a direction substantially parallel to the bands 14. The bar members 50 collide with the bands 14 when the airbag 10 is inflated, thereby preventing the detachment of the airbag 10. A preferable example employed as the bar member 50 is a bar-like object made of soft synthetic resin which allows the piercing of needle. A cord, rope, or cloth may also be employed as the bar member 50.

Figure 7:
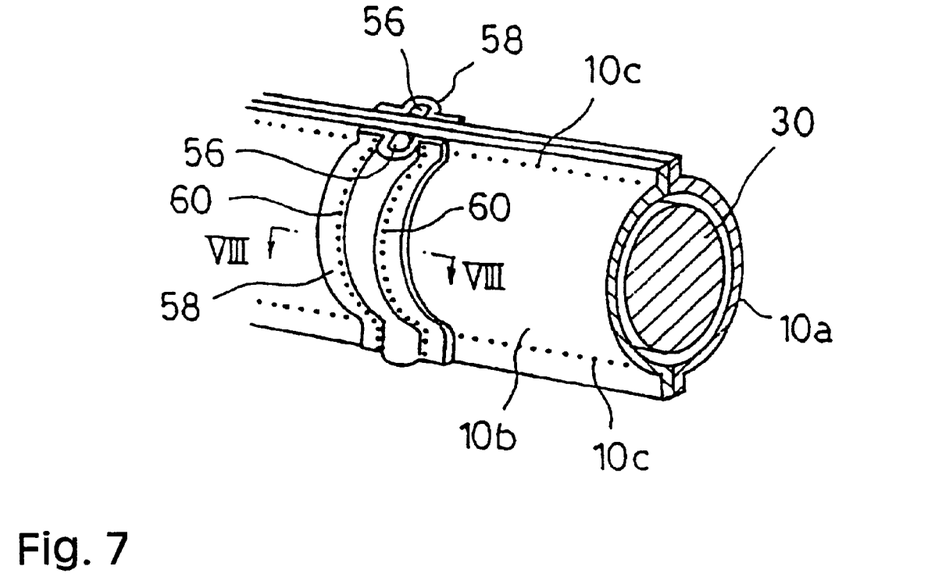
FIG. 7 is a perspective sectional view of main parts of a connecting structure between an airbag and an inflator according to a further embodiment of the invention.
Figure 8:
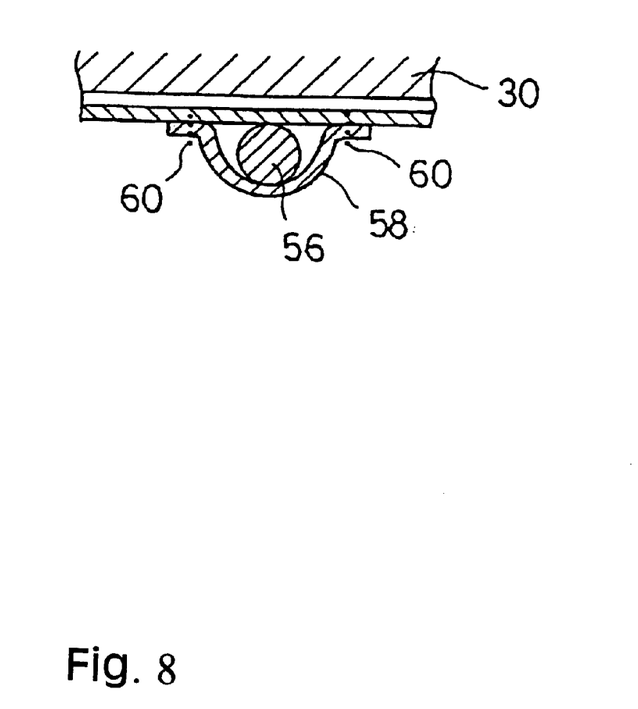
FIG. 8 is a sectional view taken along a line VIII—VIII of FIG. 7.

FIG. 7 is a perspective sectional view of main parts of a connecting structure between an airbag and an inflator according to a further embodiment of the invention, and FIG. 8 is a sectional view taken along line VIII—VIII of FIG. 7.

In this embodiment, bar members 56 are held on the panels 10a, 10b by patch cloths 58. The patch cloths 58 are sewn to the panels 10a, 10b, respectively by sewing yarns 60. The bar members 56 extend in a direction substantially parallel to bands 14 as well as the aforementioned bar member 50. The bar members 56 collide with the bands 14 when the airbag is inflated, thereby preventing the detachment of the airbag.

Figure 9:
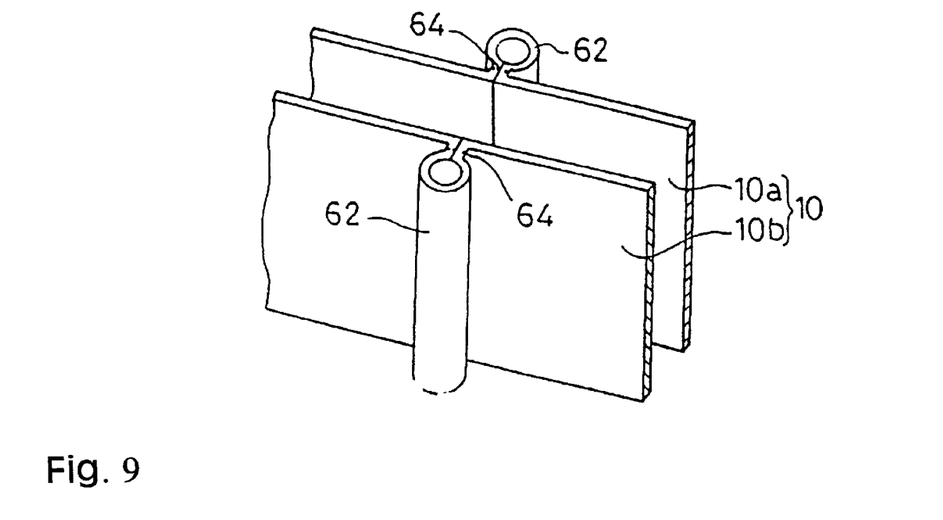
FIG. 9 is a perspective view of panels used in another embodiment of the invention.
Figure 10:
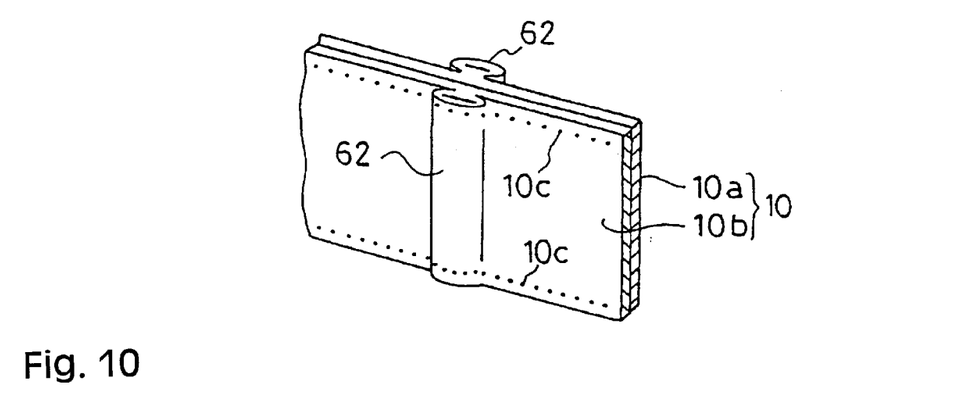
FIG. 10 is a perspective view of the panels shown in FIG. 9 in the sewn state.
Figure 11:
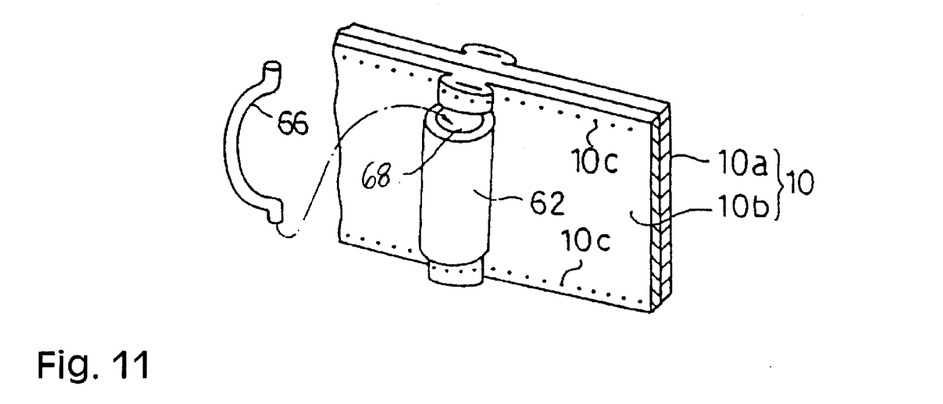
FIG. 11 is a perspective view of the panels shown in FIG. 10 and a bar member.

FIG. 9 is a perspective view of panels used in another embodiment, FIG. 10 is a perspective view showing the panels of FIG. 9 in a sewn state, and FIG. 11 is a perspective view showing the panels in a state where a loop of the sewn panels is cut off.

In this embodiment, loops 62 are formed in panels 10a, 10b of the airbag by sewing yarns 64. The panels 10a, 10b are faced to each other and sewn together by sewing yarns 10c. An opening 68 is formed in each loop 62 by cutting the loop 62 by scissors, a cutter, or the like. Inserted in each loop 62 through the opening 68 is a bar member 66. Also in this case, the bar members 66 extend in a direction substantially parallel to the bands 14 (not shown in FIGS. 9–11). The bar members 66 collide with the bands 14 when the airbag is inflated, thereby preventing the detachment of the airbag 10.

The bar members 56, 66 may be made of synthetic resin, metal, or other material. The bar members 56, 66 may be bent after insertion in the patch cloths 58 or the loops 62 or may be previously bent as shown in FIG. 11.

Figure 12:
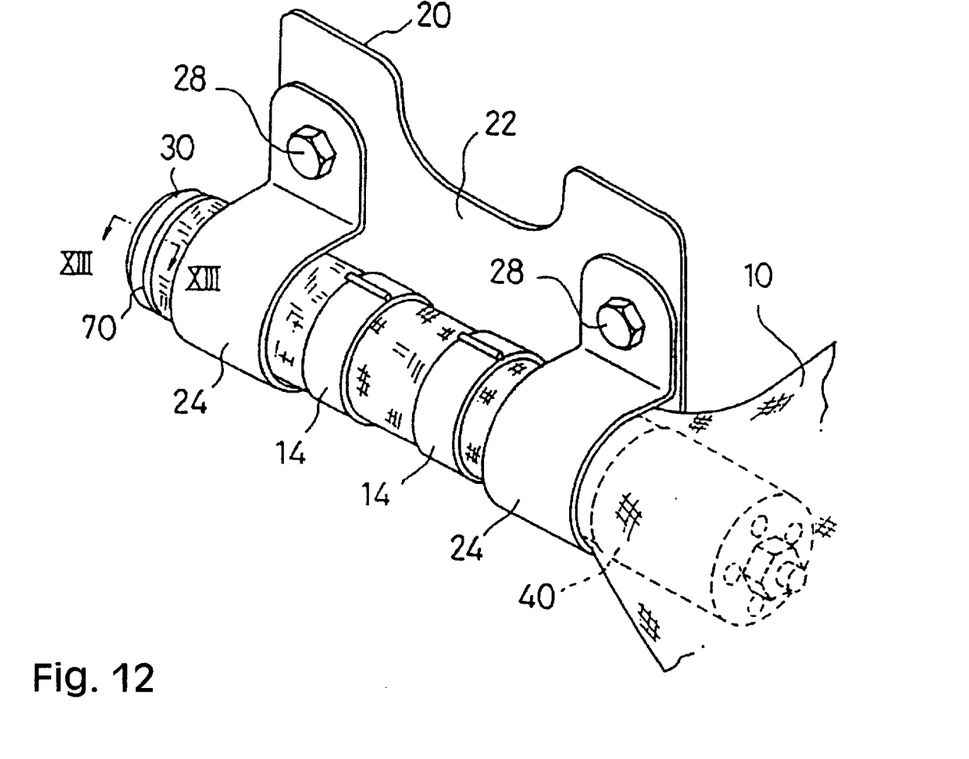
FIG. 12 is a perspective view of yet another embodiment of the invention.
Figure 13:
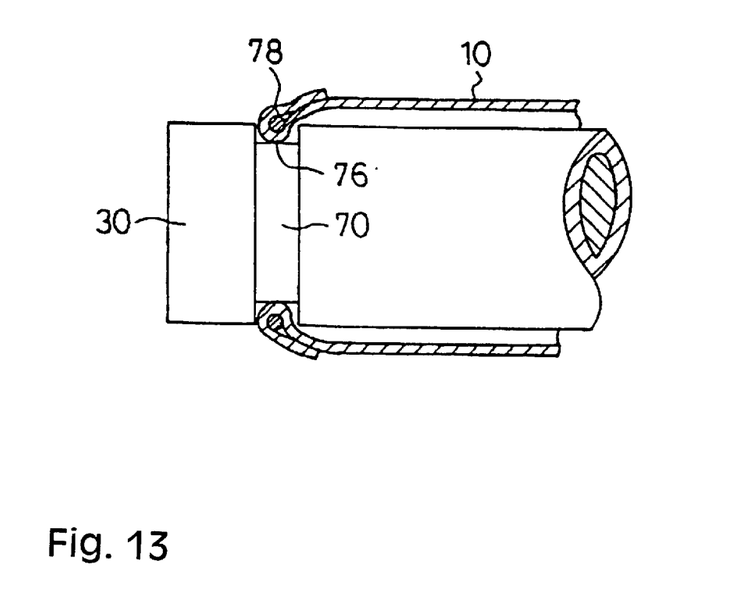
FIG. 13 is a sectional view taken along a line XIII—XIII of FIG. 12.
Figure 14:
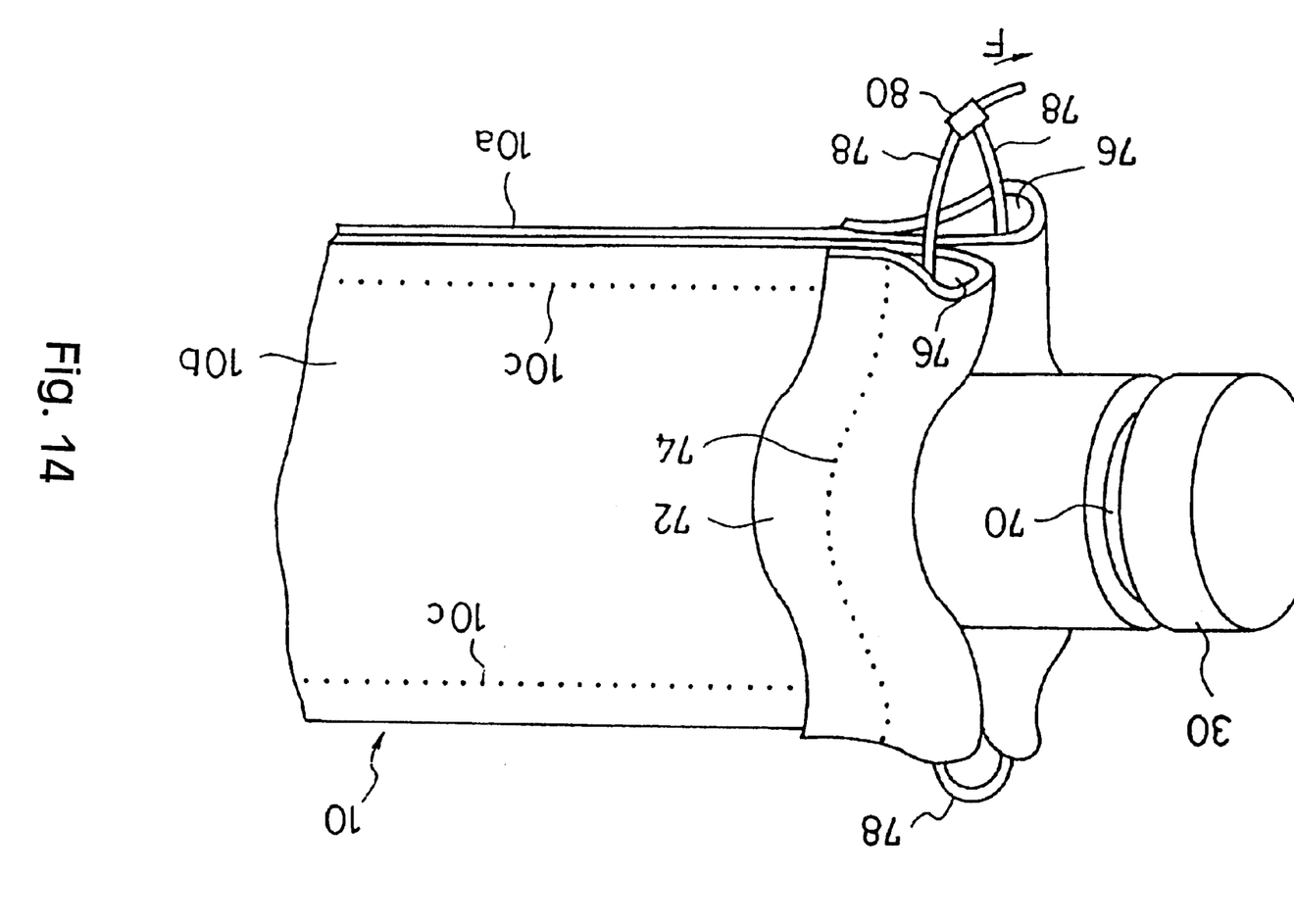
FIG. 14 is a perspective view detailing the structure shown in FIGS. 12 and 13.

FIG. 12 is a perspective view of main parts of a connecting structure between an airbag and an inflator according to still another embodiment, FIG. 13 is a sectional view taken along a line XIII—XIII of FIG. 12, and FIG. 14 is a perspective view of the connecting structure between the airbag and the inflator of FIG. 12 on the way of assembly.

In this embodiment, an inflator 30 is provided with a groove 70 formed in a rear portion thereof. Edge portions of a gas inlet of an airbag 10 is pushed into the groove 70 by means of wire 78. The edge portions of the gas inlet of the airbag 10 are folded back for a predetermined length to form folded margins 72. The folded margins 72 are sewn to the edge portions by sewing yarns 74 so as to form through portions 76 for the wire 78. The wire 78 is provided integrally with a wire anchor 80 at an end thereof. The other end of the wire 78 is inserted through the wire anchor 80. The wire anchor 80 allows the free passage of the wire 78 in a direction of arrow F and does not allow the passage of the wire 78 in the opposite direction.

After the wire 78 is inserted through the through portions 76 as shown in FIG. 14 and the other end of the wire 78 is inserted a little through the wire anchor 80, the through portions 76 are aligned with the groove 70 and then the wire 78 is closed by drawing the other end of the wire 78. Therefore, the edge portions of the airbag 10 is pushed into the groove 70 as shown in FIG. 13, thereby securely connecting the airbag 10 to the inflator 30.

As described above, the present invention can provide quite high strength in the connection between an airbag and a rod-type inflator.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The priority application here, Japanese patent application No. H10-260192, filed Sep. 14, 1998, is hereby incorporated by reference.

We claim:

1. A connecting structure between an airbag and an inflator comprising:

an inflator having gas ports formed in an end portion thereof;

an airbag having a gas inlet fitted onto the inflator so that the gas ports direct gas into the airbag;

a binding member for fixing the gas inlet of the airbag to the inflator; and a securing member for preventing the airbag from coming off the inflator, wherein said securing member comprises stitches which rise from the outer surface of said airbag and are positioned on the opposite side of the binding member from the gas ports so that when the airbag is inflated the stitches contact the binding member and prevent the airbag from coming off the inflator.

2. A connecting structure between an airbag and an inflator comprising:

an inflator having gas ports formed in an end portion thereof;

an airbag having a gas inlet fitted onto the inflator;

a binding member for fixing the gas inlet of the airbag to the inflator; and a securing member for preventing the airbag from coming off the inflator, a holder for fixing said inflator to a vehicle body, wherein said holder comprises a plate and a plurality of holding portions, wherein each holding portion projects from said plate and holds the inflator and an area of the gas inlet of the airbag fitted onto said inflator to a vehicle body; and wherein said binding member is arranged between at least two of said holding portions.

3. A connecting structure between an airbag and an inflator as claimed in claim 2, wherein the securing member comprises a cloth member sewn to the outer surface of said airbag.

4. A connecting structure between an airbag and an inflator as claimed in claim 2, wherein said securing member comprises a bar member which is inserted into a through portion formed in the airbag.

5. A connecting structure between an airbag and an inflator as claimed in claim 2, wherein said inflator has a groove formed in the outer surface thereof and wherein said securing member comprises a portion of the airbag which is retained in the groove.

6. A connecting structure between an airbag and an inflator as claimed in claim 2, wherein said securing member is positioned between at least two of said holding portions and comprises stitches which rise from the outer surface of said airbag.

7. A connecting structure between an airbag, for a vehicle, and an inflator comprising:

a tube shaped inflator having a gas outlet port located at one end;

an airbag having a tube shaped gas inlet portion and a main portion configured to be inflated by a gas, the gas inlet portion being positioned around the inflator;

a holder for securing the airbag and the inflator to the vehicle, wherein the holder includes a pair of bands that surround the airbag and the inflator;

a binding ring positioned between the bands for fixing the gas inlet of the airbag to the inflator; and a securing member positioned between the bands for preventing the airbag from coming off the inflator.

8. The connecting structure of claim 7, wherein the securing member comprises stitches that are raised outward from the surface of the airbag and positioned on the side of the binding ring away from the main portion of the airbag so that when the airbag inflates and tends to slide off of the inflator the stitches engage the binding ring thereby preventing detachment of the airbag from the inflator.

9. The connecting structure of claim 8, wherein the stitches extend in a ring circumferentially around the gas inlet portion of the airbag.

10. The connecting structure of claim 7, wherein the securing member comprises a strip of material sewn to the exterior of the gas inlet portion of the airbag.

11. The connecting structure of claim 10, wherein the securing member further comprises a bar shaped member positioned between the strip of material and the airbag.

12. The connecting structure of claim 10, wherein the material comprises a synthetic resin.

13. The connecting structure of claim 7, wherein each of the bands is saddle shaped.

14. The connecting structure of claim 13, wherein each of the bands is integrally connected to a plate at one end and is configured to wrap around the gas inlet and the inflator to be fastened to the plate at another end.

15. The connecting structure of claim 14, further comprising a pair of fasteners for connecting the other end of the bands to the plate and the holder to the vehicle.

16. A connecting structure between an airbag, for a vehicle, and an inflator comprising:

an airbag having a tube shaped gas inlet portion and a main portion configured to be inflated by a gas;

a tube shaped inflator having a gas outlet port located at one end, the inflator extending through an opening in the airbag to be positioned inside the gas inlet portion;

a holder for securing the airbag and the inflator to the vehicle, wherein the holder includes a pair of bands that surround the airbag and the inflator;

a binding ring positioned between the bands for fixing the gas inlet of the airbag to the inflator; and a securing member comprising a wire passing through a circumferential passage in the airbag, the wire being located adjacent the opening of the airbag and configured to be tightened to secure the airbag to the inflator.

17. The connecting structure of claim 16, wherein the inflator includes a circumferential groove for receiving the circumferential passage in the airbag containing the wire.

* * * * *